United States Patent [19]

Malloy et al.

[11] 4,414,120

[45] Nov. 8, 1983

[54] ENHANCED OIL RECOVERY

[75] Inventors: Thomas P. Malloy, Lake Zurich; Raymond J. Swedo, Mt. Prospect, both of Ill.

[73] Assignee: UOP Inc., Des Plaines, Ill.

[21] Appl. No.: 274,914

[22] Filed: Jun. 18, 1981

[51] Int. Cl.³ ............................................. E21B 43/22
[52] U.S. Cl. .............................. 252/8.55 D; 166/274; 166/275; 260/505 A
[58] Field of Search .............. 252/8.55 D; 260/505 C, 260/505 A, 505 R, 504 R

[56] References Cited

U.S. PATENT DOCUMENTS

| | | | |
|---|---|---|---|
| 2,227,999 | 1/1941 | Brandt et al. | 260/505 |
| 2,567,854 | 9/1951 | Nixon | 260/505 |
| 3,493,048 | 2/1970 | Jones | 166/275 X |
| 3,508,611 | 4/1970 | Davis et al. | 252/8.55 X |
| 3,574,720 | 4/1971 | Devault | 260/505 |
| 3,970,690 | 7/1976 | Suzuki et al. | 260/505 |
| 3,981,361 | 9/1976 | Healy | 252/8.55 X |
| 4,008,165 | 2/1977 | Maddox, Jr. et al. | 252/8.55 |
| 4,013,569 | 3/1977 | Chiu et al. | 252/8.55 |
| 4,058,467 | 11/1977 | Sias | 252/8.55 |
| 4,110,229 | 8/1978 | Carlin et al. | 252/8.55 |
| 4,171,323 | 10/1979 | Marin et al. | 252/8.55 X |
| 4,214,999 | 7/1980 | Carlin | 252/8.55 |

Primary Examiner—Herbert B. Guynn
Attorney, Agent, or Firm—James R. Hoatson, Jr.; Raymond H. Nelson; William H. Page, II

[57] ABSTRACT

Petroleum may be recovered from subterranean reservoirs containing oil in an enhanced oil recovery process by utilizing an aqueous surfactant slug comprising a mixture of a neutralized sulfonate salt of an alkylated gas oil, said gas oil having been obtained from the thermal cracking of coal, a lower alkyl alcohol containing from about 3 to about 6 carbon atoms and a non-ionic surfactant comprising an ethoxylated alcohol containing from about 12 to about 15 carbon atoms. The surfactant slug will provide a low interfacial tension against the oil.

5 Claims, No Drawings

ENHANCED OIL RECOVERY

BACKGROUND OF THE INVENTION

It is well known in the petroleum field that petroleum which is found in subterranean reservoirs is recovered by many different methods. The primary method of petroleum recovery is by the primary recovery means which employs natural forces such as pressure, either by the petroleum itself or by the presence of gases, whereby petroleum is forced from the subterranean reservoir to the surface and recovered. Subsequent to the recovery of the petroleum by the primary means, due to the dissipation of the natural or gaseous pressure, more of the petroleum in the reservoir may be recovered by a secondary process in which water is forced into the reservoir to provide the pressure necessary to force the petroleum from the reservoir to the surface.

At some point in the recovery of petroleum, a state is reached in which it is more costly to use the water pumped in relative to the amount of oil which is recovered by this method. However, inasmuch as a relatively large amount of petroleum may still be present in the reservoir, either in a pool or by being trapped in interstices of relatively porous rock, it is necessary to effect the recovery of the petrolium by a tertiary method. The tertiary method or the enhanced oil recovery method may be effected by many different methods. For example, one tertiary recovery method may be thermal in nature in which steam is pumped into the reservoir to force the oil to the surface. However, some oil may be lost due to burning and, by combining the cost of the lost oil with the cost of the equipment and energy necessary to form the steam, may render such a method economically unattractive to operate. A second tertiary recovery method may comprise a fire flood method in which a portion of oil is ignited to create gases as well as reducing the viscosity of the heavy crude with a concomitant increase in pressure to force the oil from the reservoir. However, as in the method previously discussed, the drawback to this method is in the fact that some of the assets are being destroyed, thus increasing the cost of the operation. A third method for enhanced oil recovery is in the use of carbon dioxide to provide the pressure required to force the oil to the surface. In this method, the carbon dioxide is pumped into the oil reservoir to dissolve some of the heavies present which, in turn, will reduce the viscosity and allow the oil to reach the surface. The disadvantage which is present when utilizing such a method is the requirement for relatively expensive equipment to produce the carbon dioxide. In addition, the method is dependent upon the ready availability of carbon dioxide. Yet another method for enhanced oil recovery is found in the use of chemicals such as water-soluble polymers including polyacrylamide, biopolymers, etc. These polymers will increase the viscosity of the water in the solution and render the mobility ratio of water to oil more favorable whereby the solution will act more favorably as a plug.

Another method of effecting an enhanced oil recovery is by utilizing surfactants as a plug, whereby the oil which is present in the reservoir may be recovered by injecting an aqueous fluid containing a surfactant or a combination of surfactants along with other compounds into the reservoir. The use of surfactants in this system is necessary inasmuch as water alone does not displace petroleum with a relatively high degree of efficiency. This occurs due to the fact that water and oil are relatively immiscible and, in addition, the interfacial tension between water and oil is relatively high. The use of surfactants will lower or reduce the interfacial tension between the water and the oil, thus reducing the force which retains the oil which has been trapped in capillaries.

The prior art is replete with various surfactants which have been used in this tertiary system for the recovery of petroleum. One type of surfactant which has been employed in many processes involves a petroleum sulfonate. The petroleum sulfonate fractions have been obtained by sulfonating a crude oil. However, this crude oil feedstock contains a vast and varied number of chemical structures including aromatic hydrocarbons, paraffinic hydrocarbons, olefinic hydrocarbons, to name a few. However, a disadvantage in utilizing crude oil as a feedstock is that the feedstock usually does not contain a major portion of aromatic compounds which are the effective material which is sulfonated. As will hereinafter be shown, by utilizing a feedstock of the type of the present invention, it will be possible to obtain a greater amount of sulfonated product which is therefore available to act in the capacity of lowering the interfacial tension between oil and water when used as a surfactant.

As was previously discussed, prior U.S. patents teach the use of these petroleum sulfonates as one component of a surfactant mixture which may be used in a surfactant oil recovery process. For example, U.S. Pat. No. 4,214,999 discloses a surfactant fluid for use in flooding subterranean formations which contains petroleum comprising petroleum sulfonates possessing certain average equivalent weights and a solubilizing co-surfactant such as ethoxylated alkanols, sulfates or sulfonates. U.S. Pat. No. 4,013,569 also discloses a surfactant system for the recovery of petroleum utilizing a relatively water-soluble aromatic ether polysulfonate as one component in the system. Another U.S. patent, namely U.S. Pat. No. 4,008,165, utilizes an aqueous surfactant containing fluid which includes a mixture of three surfactant materials including a sulfonate surfactant derived from an alkyl or alkyl aromatic radical along with a phosphate ester surfactant and a sulfonated betaine, the system also being utilized in an oil recovery process.

BRIEF SUMMARY OF THE INVENTION

This invention relates to a process for the recovery of petroleum from subterranean reservoirs or formations which contain the same. More specifically, the invention is concerned with an enhanced oil recovery process in which petroleum which is present in a subterranean reservoir is forced to the surface and recovered by utilizing an aqueous surfactant slug containing, as one component thereof, a sulfonate of an alkylated gas oil, said gas oil having been obtained from the thermal cracking of coal.

As hereinbefore set forth, the recovery of petroleum from reservoirs must be accomplished in a commercial manner which is economically viable to operate. It is necessary, in many instances, to insure the complete recovery of petroleum from a particular reservoir in order to justify the expenditures which have been made in locating, drilling, etc. the particular reservoir. After recovery of the petroleum by primary means, such as natural forces of pressure as from an underlying water drive of gas dissolved in the petroleum which can exert a sufficient amount of pressure within the formation to force the petroleum up the well and to the surface, a secondary means of recovery may be expended. This supplemental recovery process may be accomplished by water flooding in which water is injected into the subterranean reservoir or formation. Following this, a tertiary or enhanced oil recovery system may be employed to further recover additional amounts of petroleum still present in the formation.

It is therefore an object of this invention to provide a process for the enhanced recovery of oil. A further object of this invention is found in a process for the enhanced recovery of oil utilizing a surfactant slug containing a particular compound which acts as a surfactant for lowering the interfacial tension between the petroleum and water.

In one aspect, an embodiment of this invention resides in a process for the enhanced oil recovery wherein an aqueous surfactant slug is introduced into the subterranean reservoir of oil to displace said oil from said reservoir, the improvement which comprises utilizing as one component of said slug a sulfonate of an alkylated gas oil having been obtained from the thermal cracking of coal.

A specific embodiment of this invention is found in a process for enhanced oil recovery utilizing an aqueous surfactant slug for reducing interfacial tension, said slug comprising a sulfonate of an alkylated gas oil, said gas oil having been obtained from the thermal cracking of coal, said alkylated gas oil possessing a molecular weight in the range of from about 300 to about 500, said sulfonate having been neutralized by the addition of a sodium compound, a lower alkyl alcohol containing from about 3 to about 6 carbon atoms, and a nonionic surfactant comprising an ethoxylated n-alcohol containing from about 12 to about 15 carbon atoms.

Other objects and embodiments may be found in the following further detailed description of the present invention.

DETAILED DESCRIPTION OF THE INVENTION

As hereinbefore set forth, the present invention is concerned with an aqueous surfactant slug which is used in an enhanced oil recovery process, said slug utilizing as one component thereof a sulfonate of an alkylated gas oil, said gas oil having been obtained from the thermal cracking of coal. As was previously discussed, surfactant slugs have been used in enhanced oil recovery processes in which one of the components of the slug comprised a sulfonated petroleum fraction. Coal, which contains a wide variety of chemical compounds, is highly aromatic in nature and the gas oil which is obtained from the thermal cracking of coal also possesses a highly aromatic content. This highly aromatic content can be readily alkylated by conventional means hereinafter set forth in greater detail to produce an alkylated gas oil which may then be sulfonated and neutralized to produce a compound which will be useful in decreasing the interfacial tension between the petroleum and the water. In addition to possessing the ability to be highly sulfonated, the alkylated gas oils which have been produced from coal also have the advantage of being able to tolerate the presence of sodium chloride which is usually present in the water and which tends to precipitate a sulfonate derived from petroleum sources. The thus precipitated petroleum sulfonate will decrease the ability of the sulfonate to act as a surfactant in reducing the desired interfacial tension. Other advantages of sulfonates of alkylated gas oils lie in the tolerances of the compounds for calcium and magnesium, thereby preventing the exchange of the sodium which may be utilized to neutralize the sulfonate with the subsequent precipitation hereinbefore discussed, as well as a solubility of the sulfonated alkylated gas oil in water.

The gas oils which may be alkylated, followed by sulfonation and neutralization, and which will act as one component of an aqueous surfactant slug are obtained by the thermal cracking of a coal slurry under a hydrogen pressure. The thermal cracking of the coal may be effected in any manner known in the art and is usually effected by treating coal at a temperature in the range of from about 700° to about 1000° F. under a hydrogen pressure which may range from about 500 to about 3000 pounds per square inch. It is contemplated within the scope of this invention that any type of coal may be subjected to the thermal cracking process, either anthracite or bituminous in nature, the latter type of coal being preferred.

As hereinbefore set forth, the aqueous surfactant slug which is utilized in the process for the enhanced recovery of oil from a subterranean reservoir utilizes as one component thereof a sulfonate of an alkylated coal oil in which the coal oil has been obtained from the thermal cracking of coal. The sulfonate is utilized in a neutralized state by treatment with a compound selected from the group consisting of ammonium hydroxide and a salt of a hydroxide of a metal of Group IA or IIA of the Periodic Table. Some representative examples of these compounds which may be utilized to neutralize the sulfonate will include ammonium hydroxide, sodium hydroxide, potassium hydroxide, lithium hydroxide, magnesium hydroxide, calcium hydroxide, strontium hydroxide, ammonium carbonate, sodium carbonate, potassium carbonate, lithium carbonate, magnesium carbonate, calcium carbonate, strontium carbonate, etc. The neutralization of the sulfonate is accomplished by any manner known in the art and is not germane to the instant invention.

A second component of the surfactant slug will comprise a co-surfactant, said co-surfactant consisting of a lower alkyl alcohol containing from about 3 to about 6 carbon atoms such as n-propyl alcohol, isopropyl alcohol, n-butyl alcohol, sec-butyl alcohol, n-amyl alcohol, sec-amyl alcohol, n-hexyl alcohol, sec-hexyl alcohol, etc.

It is also contemplated within the scope of this invention that a third component of the surfactant slug will comprise a non-ionic surfactant comprising an ethoxylated normal alcohol containing from about 12 to about 15 carbon atoms in length. Specific examples of these alcohols will include ethoxy-n-dodecyl alcohol, ethoxy-n-tridecyl alcohol, ethoxy-n-tetradecyl alcohol, ethoxy-n-pentadecyl alcohol, etc. The amounts of the three components of the surfactant slug will usually comprise from about 1% to about 10% of the neutralized sulfonate of the alkylated coal oil, from about 1% to about 10% of the lower alkyl alcohol co-surfactant, and from about 0.1% to about 2% of the non-ionic ethoxylated n-alcohol surfactant. In addition, if so desired, it is also contemplated within the scope of this invention that sodium chloride may also be present in an amount in the range of from about 1% to about 5%. However, the presence of this salt is not essentially necessary for the operation of the surfactant slug in lowering the interfacial tension between the petroleum and the slug.

By utilizing a surfactant slug containing the components hereinbefore described, it is possible to effect an enhanced oil recovery in which the petroleum which is still present in the subterranean reservoirs may be displaced from the reservoir and from the interstices of relatively porous rocks also present in an economically attractive manner. The solvent of the alkylated gas oil in which the gas oil has been obtained by the thermal cracking of coal may be prepared by treating the gas oil with an alkylating agent in the presence of an alkylation catalyst. For example, the gas oil may be treated with an olefinic hydrocarbon containing from about 6 to about 18 carbon atoms in the presence of a Friedel Crafts catalyst such as aluminum chloride, aluminum bromide, zirconium chloride, ferric chloride, etc., or an acidic catalyst such as hydrogen fluoride at reaction conditions which may include a temperature of from about 40° to about 150° C. or more and a pressure which may range from atmospheric up to about 100 atmospheres or more. The olefinic hydrocarbons which may be employed as alkylating agents may be either linear or branched chain in nature and may comprise such olefins as 1-hexene, 2-hexene, 1-heptene, 2-heptene, 2-methyl-1-hexene, 3-methyl-1-hexene, 1-octene, 2-octene, 3-octene, 2-methyl-1-heptene, 3-methyl-1-heptene, 3-methyl-2-heptene, 1-nonene, 2-nonene, 3-methyl-1-octene, 3-methyl-2-octene, the isomeric decenes, undecenes, dodecenes, tridecenes, tetradecenes, pentadecenes, hexadecenes, heptadecenes, octadecenes, etc.

After separating and recovering the alkylated gas oils, the sulfonate may then be obtained by treating the alkylated gas oil in an appropriate apparatus with a sulfonating agent such as liquid sulfur trioxide, sulfuric acid, etc. in the presence, if so desired, of an organic solvent which may include paraffins such as pentane, hexane, heptane, etc., and cycloparaffins such as cyclopentane, methylcyclopentane, cyclohexane, etc. As one example of a sulfonation process, the alkylated coal gas oil may be charged to a reaction flask along with the desired solvent and thereafter charging liquid sulfur trioxide under a nitrogen blanket to the reaction apparatus. The addition of the sulfur trioxide to the alkylated coal gas oil may be effected at ambient temperature or temperatures slightly in excess of ambient, that is, up to about 50° C. over a relatively long period which may range from 1 to 10 hours or more in duration. Upon completion of the desired reaction period, the mixture may then be neutralized by the addition of an alkaline component of the type hereinbefore set forth in greater detail until an alkaline pH in excess of 7 is reached, thereafter water is added to the reaction mixture along with an equal amount of an alcohol such as isopropyl alcohol. After thorough agitation, the mixture is then heated to a temperature in the range of from about 50° to about 75° C. for a predetermined period of time and thereafter allowed to cool. The alkaline sulfate which separates upon cooling is then removed by conventional means, such as filtration, centrifugation, etc., and after the mixture is allowed to settle, it will separate into two layers. The lower aqueous/alcohol layer may then be extracted with an organic solvent such as hexane until the extracts are not colored. The upper organic layer, along with the combined extracts, may then be washed with water which is added to the aqueous layer. Thereafter, the aqueous layer is allowed to evaporate to dryness or a drying means such as a steam bath is used to yield the neutralized sulfonate derivative of the alkylated coal gas oil.

The surfactant slug or system of the present invention may be formulated by admixing a predetermined amount of the aforesaid neutralized sulfonate derivative of the alkylated coal gas oil, the co-surfactant and the non-ionic surfactant, said amounts being mixed in a water medium. The water medium which is selected for the surfactant slug will usually consist of field water which, in many instances, comprises a low gravity brine. The thus prepared surfactant slug is then utilized for a tertiary method of enhanced oil recovery. In effecting the enhanced oil recovery process, the subterranean reservoir containing the oil may be subjected to a pre-flush treatment with fresh water in order to displace the water which has been used in the secondary process and which may possess a high degree of salinity and/or hardness from the flow channels of the formation. Following the preflush treatment, the surfactant slug is injected until the desired volume of surfactant fluid is injected into the petroleum-containing formation. The surfactant slug, due to the presence of the various components including the sulfonates of an alkylated gas oil obtained by the thermal cracking of coal, will lower the interfacial tensions between the oil and the water and thus assist in forcing the oil through the formation into the wells and through the wells to the surface for recovery thereof. For the recovery of the oil, a further water injection is made into the formation, this water being sufficient to displace the surfactant and oil so that the recovery of the oil is effected in such an amount as to render the process economically feasible.

As hereinbefore set forth, the sulfonates of an alkylated gas oil which are obtained by the thermal cracking of coal will be relatively inexpensive in nature and will possess the ability to lower the interfacial tension between petroleum and water.

The following examples are given for purposes of illustrating the sulfonation of alkylated coal gas oils and other physical characteristics which the sulfonated product possesses, thus rendering the sulfonates applicable for use in an enhanced oil recovery process. However, it is to be understood that these examples are merely illustrative, and that the present process is not limited thereto.

EXAMPLE I

In this example, a coal gas oil having the designation H-coal gas oil was alkylated by charging 20.0 g of the gas oil which had an 84 wt. % aromatics content and 2.0 g of anhydrous aluminum chloride to a 100 ml 30 neck flask. The coal gas oil was obtained by slurrying dried pulverized coal with a process-derived oil to which is added compressed make-up hydrogen. The slurry and hydrogen are heated in a preheater prior to being fed to the base of a catalytic reactor containing a Co/Mo catalyst along with recycled high pressure gas that is similarly preheated. The catalyst in the reactor is suspended in an ebullated-bed by additional internal recycle-oil flow provided by a hot-oil recycle pump. The reactor product slurry is let down at essentially reactor temperature to an atmospheric pressure flash drum in which a portion of the lighter hydrocarbon liquid is flash-vaporized and fed to an atmospheric distillation tower. The slurry material remaining after the atmospheric flash can be further flashed in a vacuum drum to obtain vacuum distillate overhead and a vacuum bottoms slurry product.

The mixture was stirred under a nitrogen blanket and heated to 40° C. Over a period of 2.5 hours, 21.9 g (0.087 mole) of 1-octadecene was added in a drop-wise fashion. After approximately ½ of the olefin had been added to the mixture, the mixture spontaneously underwent an exothermic reaction and the temperature rose to 85° C. Upon completion of the addition of the olefin, the mixture was stirred for a period of 4 hours at a temperature of 75° C. and thereafter was stirred for an additional period of 60 hours at room temperature.

At the end of this period, the mixture was treated with 60 ml of a 1:1 hydrogen chloride-water mixture and thereafter was extracted with methylene chloride. The solvent was removed from the dried extract to give 38.8 g of a black viscous alkylated product, said product being obtained in a 100% yield, and possessed a molecular weight of 430 as determined by an osmometry analysis.

The alkylate thus produced was sulfonated by placing 10.75 g (0.025 mole) of the alkylate and 25 ml of hexane into a 100 ml 3-neck flask. The mixture was stirred and heated to a temperature of 40° C., following which 1.96 g (0.025 mole) of liquid sulfur trioxide was placed in a separate bubbler and introduced into the alkylate solution during a period of 1 hour as a 5% gaseous mixture using nitrogen as the carrier gas. Upon completion of the sulfur trioxide addition, the mixture was continuously stirred for a period of 3 hours at a temperature of 40° C. while sparging with nitrogen. Thereafter, the sulfonate was neutralized to a pH of about 8 using a 50 wt. % aqueous sodium hydroxide solution.

The product mixture which was obtained from this reaction was diluted with one volume of hexane and one volume of a 1:1 isopropyl alcohol-water mixture. After allowing the mixture to stand for a period of 1 hour, the layers were separated and the aqueous isopropyl alcohol layer was extracted with additional amounts of hexane until the extracts were colorless. The aqueous isopropyl alcohol solution was concentrated on a steam bath, cooled, and filtered to separate the sodium sulfate precipitate which had formed. The filtrate was then evaporated to dryness on a steam bath to yield 4.6 g of the sodium sulfate salt of the octadecyl H-coal gas oil. Analysis of the product showed an 85.4% sulfonate content with an equivalent weight of the sulfonate salt being

EXAMPLE II

In this example, 20.0 g (0.087 mole of aromatics) of H-coal gas oil and 2.0 g of anhydrous aluminum chloride were placed in a 100 ml flask. The mixture was warmed to 50° C. and 14.6 g (0.087 moles) of 1-dodecene were added drop-wise over a period of 1.25 hours. As in the above experiment, when about ½ of the 1-dodecene had been added, a spontaneous exothermic reaction occurred which raised the temperature to 60° C. After completing the addition, the mixture was stirred while maintaining the temperature at 65° C. for a period of 4 hours followed by stirring at room temperature for an additional period of 16 hours.

The mixture was treated with an equal volume of a 1:1 hydrogen chloride-water mixture and extracted with methylene chloride. After removal of the sulfate, 30.2 g of a green-black viscous alkylated product in a yield of 96% was recovered. The osmometric molecular weight was calculated to be 388.

The alkylate was sulfonated by placing 13.2 g (0.034 mole) of the dodecyl alkylate and 25 ml of hexane in a 100 ml 3-neck flask and heating the mixture to 40° C. Liquid sulfur trioxide in an amount of 2.7 g (0.034 mole) was placed in a separate bubbler and added to the alkylate as a 5% gaseous mixture in which nitrogen acted as the carrier gas, said addition being accomplished during a period of 2 hours. Upon completion of the sulfur trioxide addition, the mixture was stirred at a temperature of 40° C. for a period of 3 hours while sparging with nitrogen. At the end of this period, the mixture was neutralized to a pH of about 8 using a 50 wt. % aqueous sodium hydroxide solution. Thereafter, the neutralized reaction mixture was mixed with 500 ml of isopropyl alcohol and then rotary evaporated to remove the hexane, isopropyl alcohol, and water. The residue which remained from the evaporation was dissolved in methylene chloride, cooled, and subjected to a filtration step to separate the precipitated sodium sulfate from the liquid layer. The filtrate was then evaporated to dryness, the residue was dissolved in a 1:1 isopropyl alcohol-water mixture and extracted with hexane until the extracts were colorless.

The hexane-extracted isopropyl alcohol-water solution was then evaporated to dryness on a steam bath to produce 11.2 g of the sodium sulfonate salt of the dodecyl alkylate of H-coal gas oil. Analysis of the products showed a sulfonate content of 93.6%, while the equivalent weight of the sulfonate salt was determined to be 482.

EXAMPLE III

The interfacial tension measurements of the sodium sulfonate salt of the dodecyl alkylated H-coal gas oil were obtained by using the spinning drop technique set forth in the article *Adsorption At Interfaces*, by J. L. Cayias, R. S. Schechter, and W. H. Wade, ACS Symposium Series No. 8, 1975, Page 234. The solution which was used for the interfacial tension measurements consisted of 0.70 g per liter of the sodium sulfonate salt of the dodecyl alkylated H-coal gas oil, 10.0 g per liter of sodium chloride, and 20.0 ml per liter of an n-butyl alcohol co-surfactant. This solution was measured against a series of pure hydrocarbons, the results of these tests being set forth in Table I below.

TABLE 1

| Hydrocarbon | IFT (dynes/cm) |
|---|---|
| $C_5$ | $4.71 \times 10^{-2}$ |
| $C_6$ | $2.65 \times 10^{-2}$ |
| $C_7$ | $5.97 \times 10^{-2}$ |
| $C_8$ | $2.39 \times 10^{-2}$ |
| $C_9$ | $5.84 \times 10^{-3}$ |
| $C_{10}$ | $3.35 \times 10^{-3}$ |
| $C_{12}$ | $3.49 \times 10^{-3}$ |
| $C_{14}$ | $1.87 \times 10^{-3}$ |
| $C_{16}$ | $2.48 \times 10^{-3}$ |

It is readily discernable from the above data that the neutralized sulfonate salts of alkylated coal gas oil are effective for reducing interfacial tension, being well within the desired parameters for effective enhanced oil recovery.

We claim:

1. A process for the enhanced recovery of oil from a subterranean reservoir of oil which comprises the introduction of a three component aqueous surfactant slug into said subterranean reservoir of oil to enhance the displacement of oil from said reservoir; the three components being:

(i) from about 1% to about 10% of a sulfonate of an alkylated gas oil having a molecular weight of from about 300 to about 500, wherein said alkyl substituent contains from about 6 to about 18 carbon atoms, and wherein said gas oil has been obtained from the thermal cracking of coal, alkylation of said gas oil having been conducted in the presence of an alkylation catalyst;

(ii) from about 1% to about 10% of a lower alkyl alcohol containing from about 3 to about 6 carbon atoms; and (iii) from about 0.1% to about 2% of a non-ionic surfactant which is an ethoxylated normal alcohol containing from about 12 to about 15 carbon atoms;

wherein said three component aqueous surfactant is present in a sufficient amount to reduce the interfacial tension between the oil and water.

2. The process as set forth in claim 1 in which said sulfonate of said alkylated gas oil is neutralized by the addition of a compound selected from the group consisting of ammonium hydroxide and a salt of hydroxide of a metal of Groups IA and IIA of the Periodic Table.

3. The process as set forth in claim 2 in which said metal is sodium.

4. The process as set forth in claim 2 in which said metal is potassium.

5. The process as set forth in claim 2 in which said metal is lithium.

* * * * *